INVENTORS.
JOHN H. RUMBARGER
WILBUR SHAPIRO
BY Wolfe, Hubbard, Voit & Osann
ATTORNEYS.

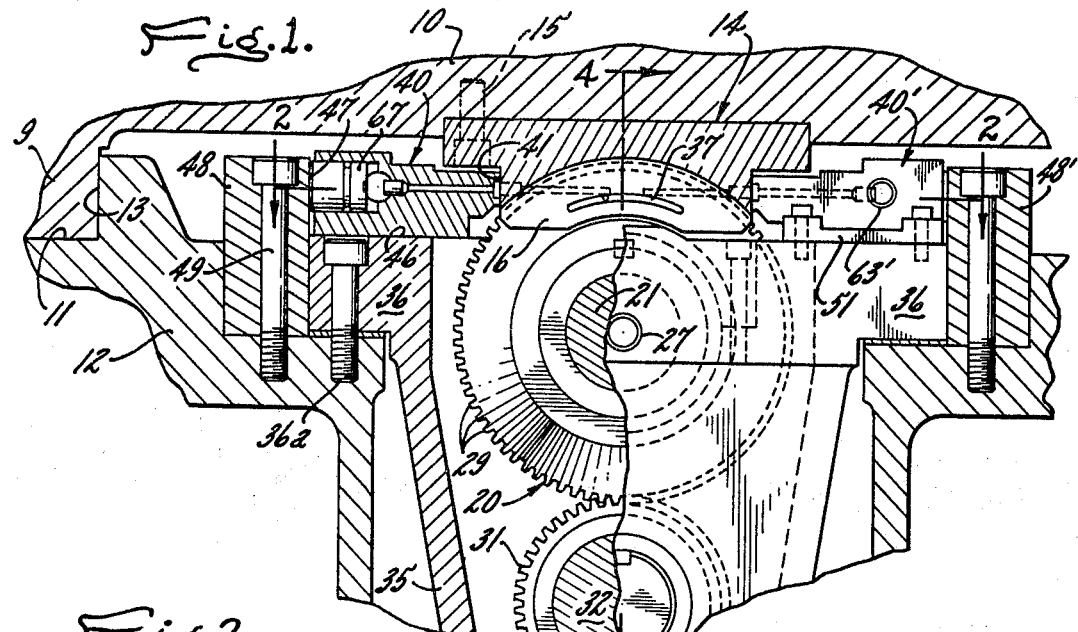
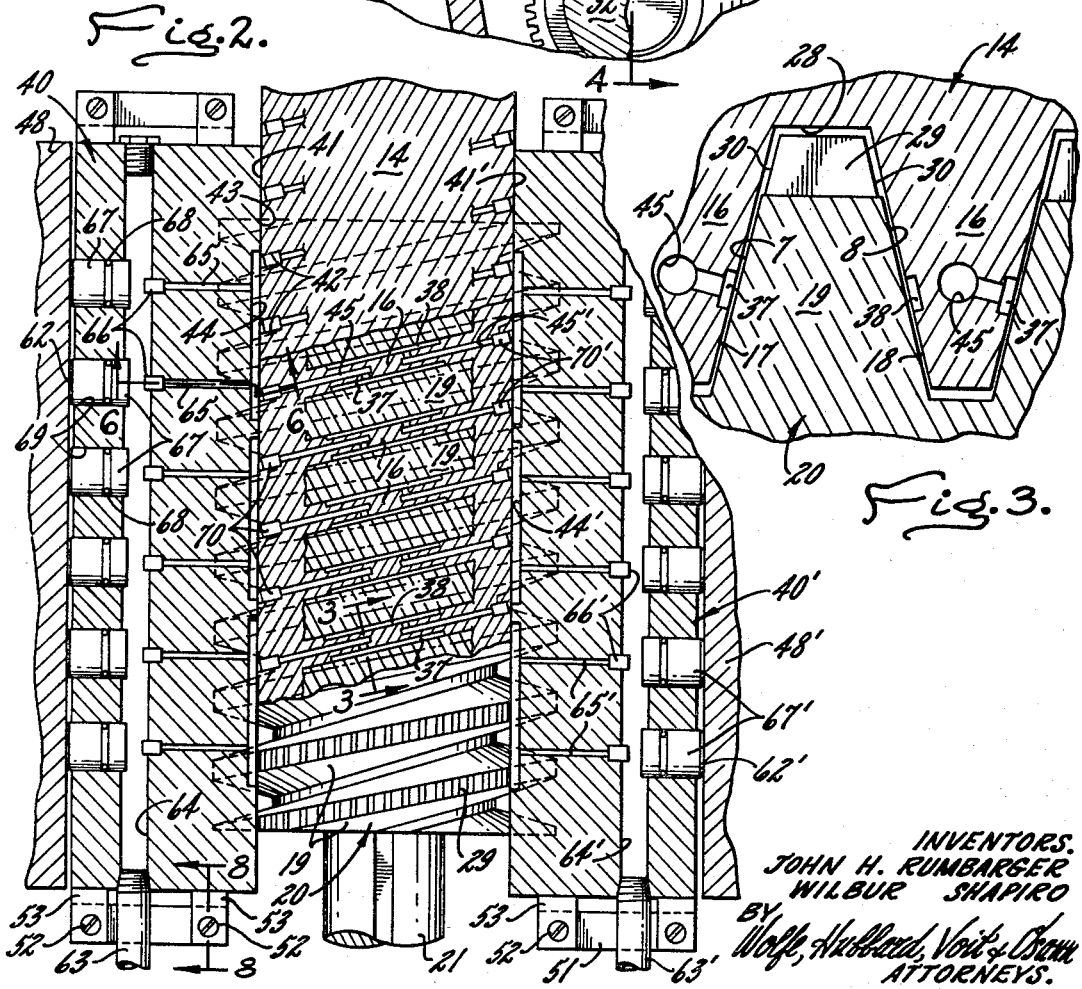

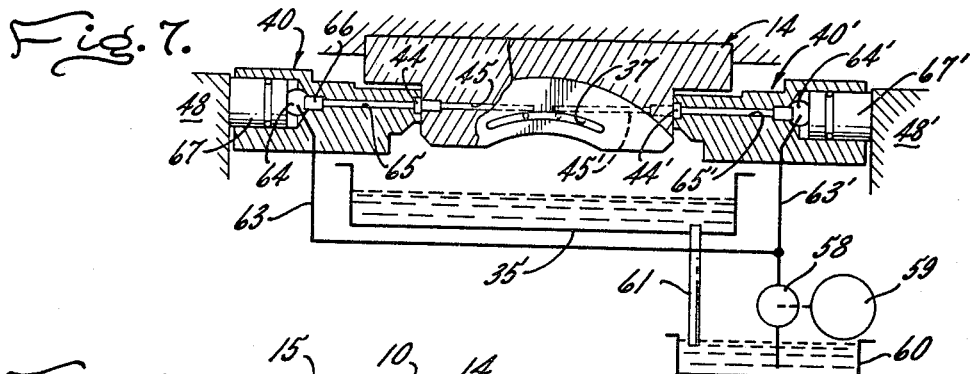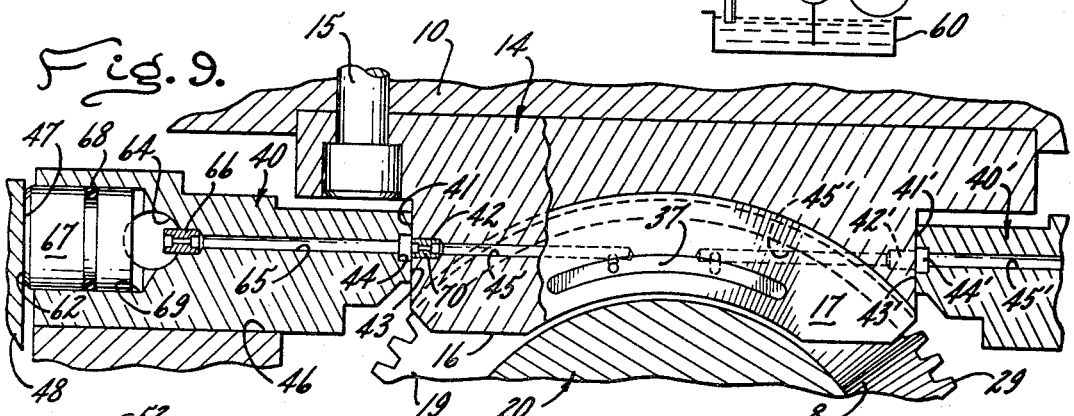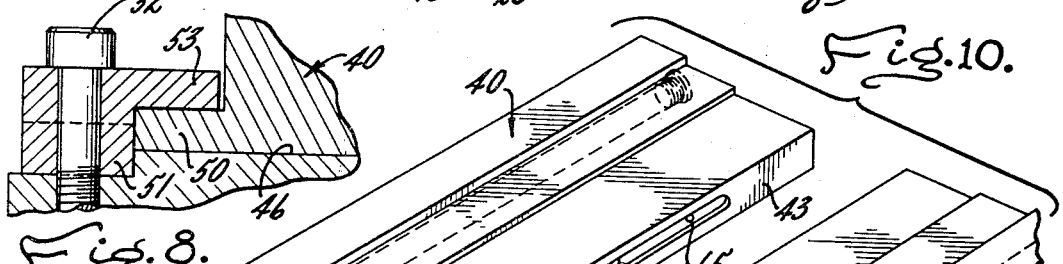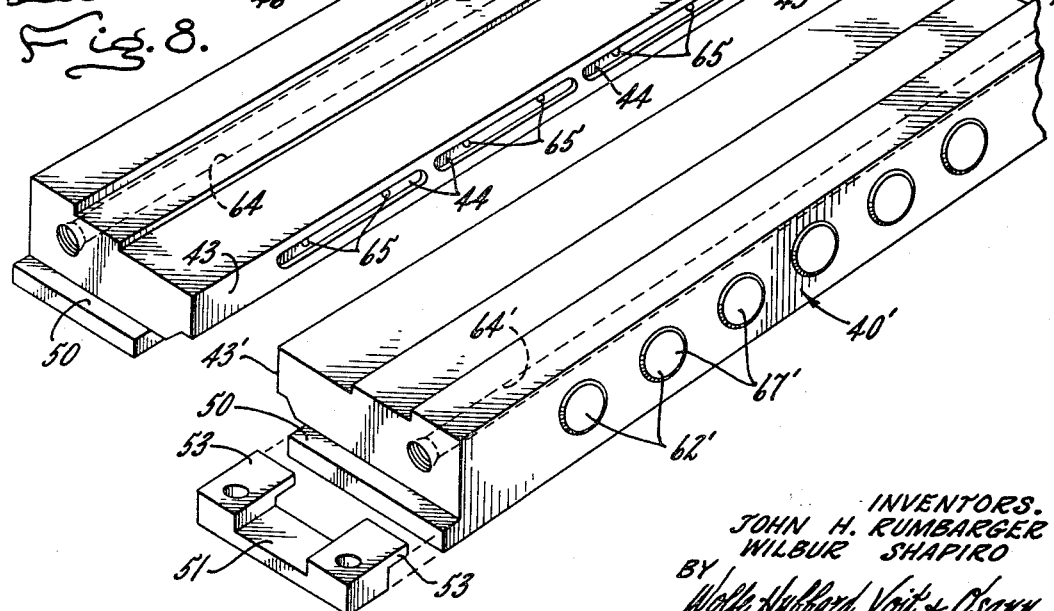

United States Patent Office 3,415,138
Patented Dec. 10, 1968

---

3,415,138
WORM-RACK TRANSMISSION WITH HYDROSTATIC TOOTH BEARINGS
John H. Rumbarger, Wayne, and Wilbur Shapiro, Huntingdon Valley, Pa., assignors to The Ingersoll Milling Machine Company, Rockford, Ill., a corporation of Illinois
Filed May 22, 1967, Ser. No. 640,281
9 Claims. (Cl. 74—409)

ABSTRACT OF THE DISCLOSURE

A machine tool table is slid back and forth by means of a toothed rack on the table meshing with a power rotated worm whose thread is separated hydrostatically from the opposed areas of the meshing rack teeth by delivering high pressure fluid from a stationary but transversely floating manifold to so-called pads in the flanks of those rack teeth which are in mesh with the thread in the different positions of the table. Pressure fluid delivered into the manifold is utilized to supply not only the pressure pads in the meshing rack teeth but also a hydrostatic bearing between the opposed surfaces of the rack and the manifold. The compensating orifices for the pressure pads in the rack teeth are disposed in the rack downstream from the hydrostatic manifold bearing.

Background of the invention

The invention relates to a power driven transmission for reciprocating a machine element along a rectilinear path by a worm rotating about an axis paralleling such path and having a thread meshing on opposite sides with a plurality of teeth of a rack extending along the path. More particularly, the invention is an improvement over the system disclosed in the application of Robert W. Sullivan, Ser. No. 618,721, filed Feb. 27, 1967, and involving hydrostatic bearings disposed between the worm and the meshing rack teeth and selectively supplied with pressure fluid from a stationary manifold.

Summary of the invention

The present invention aims to increase the accuracy and stiffness of the hydrostatic support for the reciprocating rack by minimizing uncontrolled leakage of the pressure fluid between the manifold and the pads on the meshing rack teeth. This is accomplished by utilizing the pressure of the fluid delivered into the manifold to provide a continuously flowing hydrostatic film between the opposed surfaces of the manifold and rack and by locating the compensating orifices for the hydrostatic pads of the rack teeth within the rack and downstream from the manifold film.

The invention also resides in the novel manner of utilizing the supply pressure within the manifold to actuate pistons which apply the pressure for continuously urging the manifold against the moving rack.

Brief description of the drawings

FIGURE 1 is a fragmentary transverse sectional view of the improved worm-rack drive as applied to the table of a machine tool.

FIG. 2 is a fragmentary section taken along the line 2—2 of FIG. 1.

FIG. 3 is an enlarged fragmentary section taken along the line 3—3 of FIG. 2.

FIG. 7 is a hydraulic circuit diagram.

FIG. 8 is a fragmentary section taken along the line 8—8 of FIG. 2.

FIG. 9 is an enlargement of part of FIG. 1.

FIG. 10 is a fragmentary perspective view of the fluid distributing manifold.

Description of the preferred embodiment

Figure 5:
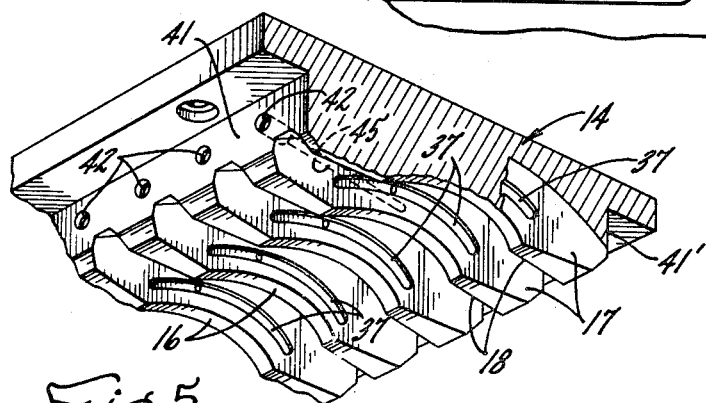
FIG. 5 is a fragmentary underside perspective of the rack.

In the drawings, the invention is shown incorporated in a drive for a machine tool table 10 supported on horizontal ways 11 along an elongated bed 12 and having flanges 9 depending along opposite side edges and guided by parallel upright walls 13 along the base. The rack 14 of the present transmission is an elongated bar extending along the center line of the table substantially the full length thereof and secured as by screws 15 to the under side of the table. It is curved in cross-section and the teeth 16, which constitute segments of a nut, are inclined transversely of the rack as shown in FIG. 2 and 5 and have opposite flanks 17 and 18 which coverage downwardly at a suitable included angle as shown in FIG. 3.

Mating properly with the rack teeth is the thread 19 of a hollow worm 20 which is substantially shorter than the rack and is journaled on the bed 12 at about center of the range of movement of the table. The worm extends along the center of the rack and its axis parallels the table guideways. Its cross-section complements the cross-section of the interdental spaces between the rack teeth as shown in FIG. 3. For a purpose to appear later, the total clearance between the flanks 7 and 8 of the thread and the meshing areas 17 and 18 of the rack teeth is about .004 of an inch, these clearances being exaggerated in FIG. 3.

Figure 4:
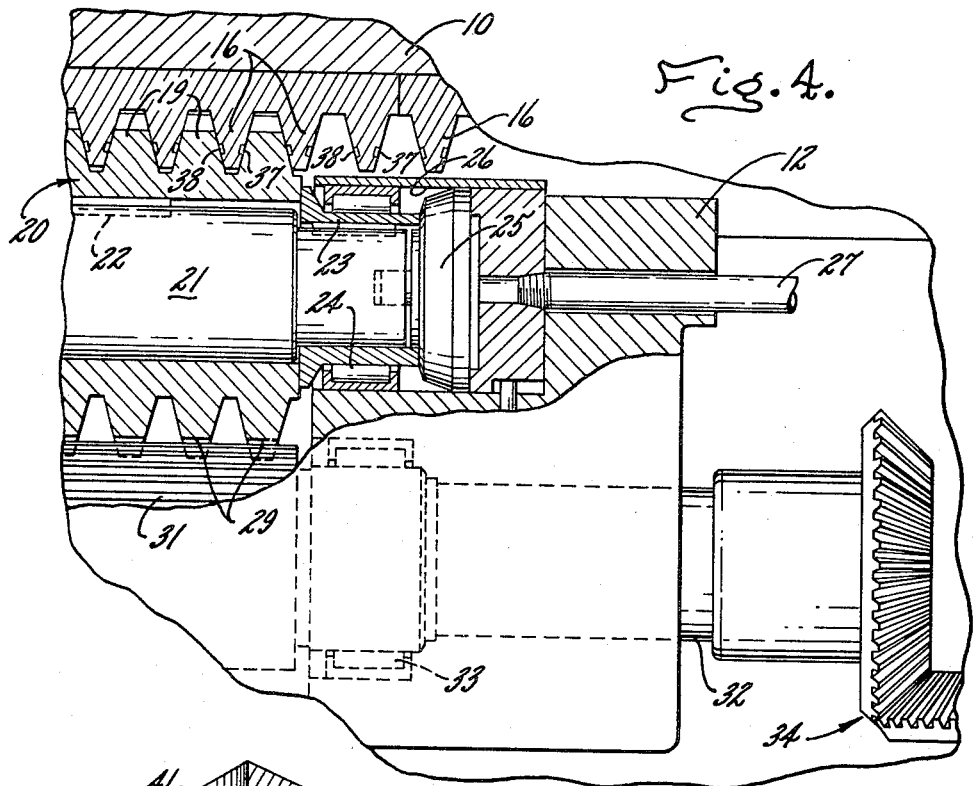
FIG. 4 is a fragmentary section taken along the line 4—4 of FIG. 1.

A shaft 21 (FIG. 4) extends through and is keyed at 22 to the worm and opposite ends thereof are telescoped in and keyed to sleeves 23 abutting the ends of the worm and journaled in bearings 24 mounted on the bed. The axial position of the worm is fixed by thrust bearings herein comprising pistons 25 slidable in cylinders 26 and held in abutment with the sleeves by pressure fluid supplied through pipes 27.

Power for driving the worm is applied to the lower side of the worm thread. For this purpose, the interdental spaces of the rack are undercut as indicated at 28 (FIG. 3) to receive gear teeth 29 cut in the worm thread around the periphery thereof beyond the contact areas. The flanks of the gear teeth are cut back at 30 to clear at all times. These mesh with the teeth of a relatively long spiral gear 31 (FIG. 4) fast on a shaft 32 which is journaled in bearings 33 on the bed and disposed beneath the worm. Power for turning the worm in opposite directions and correspondingly advancing the table may be derived from a suitable and reversible source (not shown) and transmitted to the gear shaft through gearing 34 mounted on the bed. Preferably, the lower part of the gear dips in oil contained within a reservoir 35 enclosing the sides and ends of the gear and the worm and having outturned flanges 36 clamped against the bed by screws 36ª, as shown in FIG. 1.

The opposed surfaces 7, 17 and 8, 18 of the meshing rack teeth and worm thread on the leading and trailing flanks of each meshing tooth are maintained separated hydrostatically in all longitudinal positions and in both directions of the table. For this purpose, hydraulic fluid is delivered to recesses or pads 37 and 38 within the contact areas of the flanks 17 and 18 of the rack teeth and under pressure sufficiently high to cause an outward flow of the fluid in all directions from each pad of the meshing teeth and the formation of rigid films capable of transmitting the actuating force from the worm thread to the rack while holding the opposed surfaces 7, 17 and 8, 18 on both sides of the meshing teeth accurately and out of frictional engagement.

To these ends, each pad is an elongated and relatively narrow arcuate groove (FIGS. 1 and 3) extending around the rack tooth approximately at the pitch line thereof. The opposed areas of effective contact between the flanks of the rack teeth and the worm thread and surrounding the pads are known as sill surfaces and these, in all directions outwardly from each pad, are approximately equal in width thus providing, in accordance with conventional design techniques, correspondingly equalized outward flows of fluid in forming the desired film that maintains the opposed tooth and thread surfaces separated properly.

Movement of the table 10 and rack bar thereon are utilized to control and confine the flow of such high pressure fluid to the pads 37 and 38 of only those teeth which are at any time in mesh with and covered by opposed flanks of the worm thread. Escape of the fluid through the uncovered pads beyond the ends of the worm thread is prevented thus avoiding foaming or air contamination of the fluid. Such control of the fluid flow, in the case of the pads 37 on the flanks 17 of the rack teeth, is accomplished through a manifold 40 of a length corresponding to the worm 20 and mounted on the bed 12 for sliding engagement with an outwardly facing side wall 41 on the rack paralleling the guides 13 and the table. An area of the face 43 of the manifold is recessed at 44 and adapted to register in any given position of the table with ports 42 spaced along and opening outwardly in the wall 41 of the rack and communicating through separate passages 45 with those pads 37 then in mesh with and covered by the worm thread. Preferably the wall 41 is one flat side edge of the rack and the recess 44 in the manifold comprises three elongated and separated grooves (see FIG. 10). arranged end to end and sized to provide substantially continuous communication with the ports 42 of those rack teeth which at any time are in mesh with the worm.

The fluid distributing manifold 40 is supported on the machine bed alongside the rack and held against endwise movement but adapted for limited bodily edgewise floating toward and away from the rack wall 41 to accommodate manufacturing irregularities in the opposed surfaces 41 and 43 and position variations under variable side loads on the table 10 in service use. Herein, the manifold is an elongated flat bar resting on a flat top surface 46 of the bed 12 and somewhat narrower than the space between the side 41 of the rack and the opposed parallel face 47 of a bar 48 clamped to the bed by screws 49. Flanges 50 (FIGS. 8 and 10) on opposite ends of the manifold abut crossbars 51 which are secured to the bed by screws 52 and guide the manifold in its limited edgewise floating. Lugs 53 overlying the flanges hold the manifold bar down loosely against the surface 46.

Hydraulic fluid at the pressure required at the pads 37 is supplied by a stationarily mounted pump 58 driven by a motor 59 and drawing fluid from a sump 60 to which fluid is returned after escaping across the sills surrounding the pads 37, collecting in the reservoir 35 and overflowing through a pipe 61 into the sump. A pipe 63 leading from the pump outlet and accommodating the limited floating of the manifold is threaded into one end of an elongated chamber 64 extending lengthwise through the manifold bar and plugged at its opposite end. From this chamber, the high pressure fluid is delivered to the grooves 44 in the face 43 of the manifold through passages 65 each including an orifice 66, for example, .060 in. diameter. Herein there are two passages supplying each groove 44. The capacity of the pump 58 is sufficient to maintain in the grooves and the rack ports 42 a pressure, for example 3200 p.s.i., sufficient to maintain the desired continuous flow of fluid out of the hydrostatic bearing pads 37 and across the sill surfaces surrounding the same.

In accordance with one aspect of the present invention, the fluid pressure within the manifold chamber 64 is utilized to urge the manifold 40 continuously toward the rack under a total pressure such as to form a rectilinear hydrostatic bearing between the rack and manifold surfaces 41, 43. To this end, one or more pistons 67 surrounded by seal rings 68 are disposed in cylinders 69 which open into the chamber 64 with their projecting outer ends 62 abutting the bar 48. By employing a plurality, six in the present instance, of these pistons, the desired total biasing force may be obtained while distributing this force along the manifold to minimize the danger of the latter cocking edgewise within its guides 41.

During the initial delivery of fluid to the chamber 64, the orifices 66 above described offer substantial resistance to the flow of fluid to the grooves 44 and thus cause the pressure on the inner ends of the pistons 67 to build up far enough to force and hold the manifold against the side 41 of the rack. The invention contemplates correlating properly the area and number of the pistons and the supply pressure so that under the pressure maintained in the manifold grooves 44, the surface 43 will be separated a few thousandths of an inch from the face 41 of the rack and maintain a continuous outward flow of fluid across the areas surrounding the grooves. A hydrostatic bearing is thus formed between the manifold and rack to accommodate automatically any irregularities in the contours of the opposed surfaces of the rack and manifold, the fluid flowing outwardly between the surfaces 41, 43 in a film of substantially uniform thickness.

Figure 6:
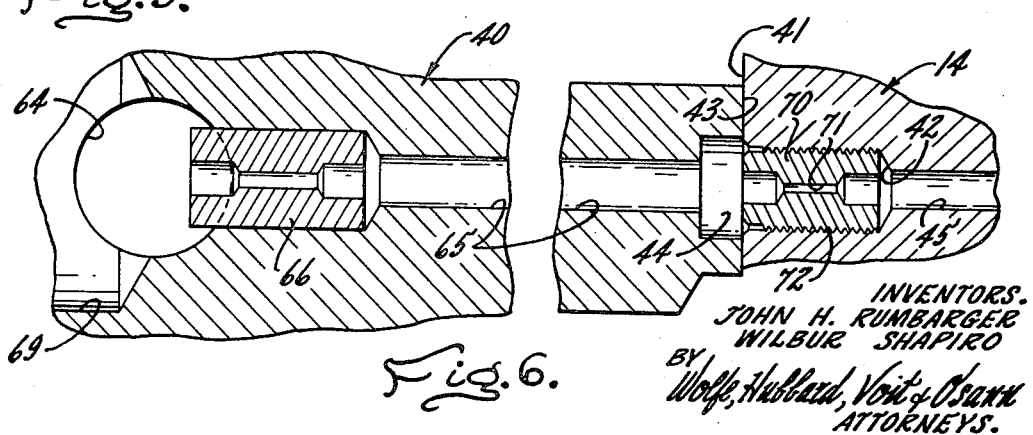
FIG. 6 is an enlarged fragmentary section taken along the line 6—6 of FIG. 2.

Where, as here, a plurality of hydrostatic bearing pads 37 are supplied with pressure fluid from a common source, it is desirable to substantially equalize the pad pressures by interposing in the passages supplying the same a compensating element 70 which may take various forms including a capillary type of orifice, an automatic orifice valve, or, as in this instance, an orifice 71 of fixed diameter, for example .020 of an inch for an inlet pressure of 1000 p.s.i. Herein, such an orifice for each pad 37 is formed in a plug 72 screwed into the port 42 at the outer end of each pad supply passage 45 (FIG. 6).

The location of the compensating orifices 71 in the rack and therefore downstream from the fluid transfer grooves 44 in the manifold 40 constitutes an important aspect of the present invention. In this position, the pressure of the fluid as supplied to the different pads 37 during the movement of the rack remains unaffected by variations in the leakage or laminar flows outwardly between the opposed surfaces 41, 43 of the rack and manifold. That is to say, variation in such leakage is compensated for automatically by virtue of the downstream location of the orifices 71. The fluid pressure supplied by the pump 58 may be regulated automatically and its capacity is sufficient to accommodate the manifold leakage while always maintaining the desired pressure at the orifices 71.

To achieve the foregoing and at the same time utilize the manifold pressure to bias the manifold against the rack, the orifices 66 in the manifold passages 65 are made large enough in diameter to insure the maintenance of adequate pressure at all times in each of the manifold grooves 44. Herein the two orifices through which each groove is supplied is about .060 in diameter. That is to say, the total effective area of the manifold orifices 66 is substantially greater than the combined areas of the orifices 70 of the rack teeth meshing at any time with the worm. By dividing the recess area in the face 43 of the manifold 40 into a plurality of separate parts 44 spaced longitudinally along the manifold face 43 and supplying pressure fluid to the respective parts through the separate passages 65, the total force urging the manifold edgewise against the rack is distributed evenly along the manifold. This substantially eliminates edgewise cocking and binding of the manifold in its guides and maintains a uniform thickness of the film escaping from the grooves and flowing outwardly between the opposite rack and manifold surfaces 41 and 43 thus contributing to the maintenance of a constant supply pressure to all of the orifices 70 of the meshing rack teeth.

A similarly constructed and mounted manifold 40' is provided on the opposite side of the rack for transmitting pressure fluid from the pump 58 to the pads 38 on the other sides 18 of those rack teeth which at any time are in mesh with the worm thread. This manifold and the corresponding parts of the fluid distributing system are indicated by the same but primed reference numbers. With the manifolds 40 and 40' disposed on opposite sides of the rack, the pad supply passages 45, 45' extend inwardly to the pads 37, 38 in opposite directions, the flow control orifices 70 and 70' of the two being disposed in these passages adjacent the side walls 41, 41' of the rack.

In operation and when the table is at rest, the rack teeth meshing with the worm will be centered between adjacent turns of the worm and the opposing flanks 7, 17 and 8, 18 will be separated by fluid films of equal thickness flowing outwardly from the pads 37, 38 in which the pressures will be equalized. As the worm starts to turn and move the table in one direction, the pressure exerted on the film on the trailing flanks of the meshing teeth will be increased in proportion to the load opposing the table motion. This increase forces a separation of the trailing flanks from the worm and a corresponding increase in the pressure in the pads on the leading flanks of the meshing rack teeth until the total pressure exerted on these flanks plus the load balances the total pressure exerted on the trailing tooth flanks. Thus, the relative pressures with the pads 37, 38 are adjusted automatically with changes in the load on the table so as to continuously maintain the opposed surfaces 7, 17 and 8, 18 separated by outwardly flowing fluid films which couple the rack and worm hydrostatically thus eliminating rubbing friction in the conversion of rotation of the worm into rectilinear motion of the table.

We claim:

1. In a rack and worm transmission having first and second supports mounted for relative movement along a rectilinear path, a rack secured to and extending along said first support and having teeth spaced along and extending transversely of said path, a power rotated worm shorter than said rack journaled on said second support to turn about an axis paralleling said path and having a multiple turn thread meshing simultaneously with a plurality of said teeth along said rack, means acting during relative movement of said supports along said path to provide hydrostatic bearings between opposed areas of said thread and the rack teeth meshing therewith comprising pads on one side of each of said rack teeth within said areas and passages leading from the respective pads to ports terminating in and spaced along a wall of said rack extending longitudinally along the rack, a rigid fluid pressure manifold extending along said wall, means on said second support mounting and guiding said manifold for limited bodily floating toward and away from said wall, means urging said manifold toward and holding the same in sliding engagement with the wall, a fluid filled recess area within the face of said manifold opposing and registering with the ports of those rack teeth which at any time are in mesh with said thread while leaving the other ports open, means for supplying fluid at high pressure to said manifold for transmission through said recess area, the registering ports, and the connected pads while maintaining an outwardly flowing film between said wall and manifold face, the improvement which includes flow restricting orifices interposed in the respective ones of said passages and coacting to insure continuous and substantially equal flows of fluid to the connected pads irrespective of variations in the escape of fluid from between said wall and manifold.

2. A rack and worm transmission as defined in claim 1 in which each of said flow restricting orifices is in a plug disposed in the outer end of one of said passages adjacent said rack wall.

3. A rack and worm transmission as defined in claim 1 in which said recess area of said manifold comprises a plurality of separated grooves arranged end to end along said manifold face, and separate passages within said manifold supplying fluid to said grooves.

4. A rack and worm transmission as defined in claim 1 including means actuated by the supply pressure in said manifold to bias said manifold yieldably against said rack wall under a force which permits of the maintenance of said outwardly flowing film.

5. A rack and worm transmission as defined in claim 5 in which said biasing means includes an abutment disposed adjacent the side of said manifold opposite said recess area, a pressure chamber in said manifold, a cylinder in a wall of said manifold extending transversely of the manifold and rack and opening at one end into said chamber and outwardly at the opposed end toward said abutment, and a piston slidable in said cylinder and bearing at its outer end against said abutment.

6. A rack and worm transmission as defined in claim 5 including at least one additional piston similarly mounted and acting in said manifold, the forces produced by said piston and biasing the manifold toward said wall being spaced apart along the manifold whereby to maintain said film of substantially uniform thickness across the entire face of the manifold.

7. A rack and worm transmission as defined in claim 5 in which said chamber communicates with said recess area through an orifice restricting the flow of fluid sufficiently to insure actuation of said piston by an initial pressure build-up in said chamber.

8. A rack and worm transmission as defined in claim 1 including a chamber in said manifold receiving fluid from said supply means, piston means actuated by initial build-up of pressure in said chamber to bias said manifold yieldably against said rack wall, and means establishing communication between said chamber and said recess area including means for restricting the flow of fluid to such area and thereby insure biasing of the manifold against said rack wall in response to the initial build-up of pressure in said chamber.

9. A rack and worm transmission as defined in claim 8 in which the effective area of said manifold flow restricting means is substantially greater than the combined effective areas of said rack orifices communicating at any time with said manifold recess area.

References Cited
UNITED STATES PATENTS

| | | | |
|---|---|---|---|
| 2,924,125 | 2/1960 | Brandon | 74—409 X |
| 3,031,897 | 5/1962 | Seidel | 74—409 X |
| 3,323,385 | 6/1967 | Revitt | 74—568 X |
| 3,361,003 | 1/1968 | Hodgson | 74—424.6 |

FRED C. MATTERN, Jr., *Primary Examiner.*

LEONARD H. GERIN, *Assistant Examiner.*

U.S. Cl. X.R.

74—424.6, 468